(12) United States Patent
Darveau

(10) Patent No.: US 6,760,383 B1
(45) Date of Patent: Jul. 6, 2004

(54) LONG REACH SDSL SYSTEM SPECTRALLY COMPATIBLE WITH ADSL SYSTEMS

(75) Inventor: Michel Francois Joseph Darveau, Aylmer (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/519,668

(22) Filed: Mar. 6, 2000

Related U.S. Application Data

(60) Provisional application No. 60/123,668, filed on Mar. 9, 1999.

(51) Int. Cl.[7] ............................................. H04L 27/00
(52) U.S. Cl. ...................................................... 375/259
(58) Field of Search ................................ 375/220, 259, 375/354, 93; 370/281, 540

(56) References Cited

U.S. PATENT DOCUMENTS

| | | | | | |
|---|---|---|---|---|---|
| 3,566,027 A | * | 2/1971 | Paine | ........................... | 348/28 |
| 3,974,337 A | * | 8/1976 | Tatsuzawa | ................... | 370/483 |
| 5,243,593 A | * | 9/1993 | Timbs | .......................... | 370/360 |
| 5,956,372 A | * | 9/1999 | Vaman et al. | ................ | 375/260 |
| 5,991,311 A | * | 11/1999 | Long et al. | .................. | 370/524 |
| 5,999,542 A | * | 12/1999 | Turner et al. | ................ | 370/497 |
| 6,005,873 A | * | 12/1999 | Amit | ........................... | 370/494 |
| 6,014,431 A | * | 1/2000 | McHale et al. | ........... | 379/93.14 |
| 6,167,034 A | * | 12/2000 | Langberg et al. | ............ | 370/281 |
| 6,246,716 B1 | * | 6/2001 | Schneider | .................... | 375/220 |
| 6,310,909 B1 | * | 10/2001 | Jones | ......................... | 375/220 |
| 6,519,291 B1 | * | 2/2003 | Dagdeviren et al. | ......... | 375/260 |
| 6,546,024 B1 | * | 4/2003 | Sharper et al. | ............. | 370/470 |

* cited by examiner

*Primary Examiner*—Stephen Chin
*Assistant Examiner*—Lawrence Williams
(74) *Attorney, Agent, or Firm*—Max R. Wood; Ogilvy Renault

(57) ABSTRACT

A method and apparatus for achieving longer data transmission distances in Symmetrical Digital Subscriber Lines (SDSL) systems, while providing spectral compatibility with Asymmetrical Digital Subscriber Lines (ADSL) systems is disclosed. The method and apparatus enables deployment of SDSL and ADSL in any mix in a binder group of twisted pair copper wires without sacrificing performance of either system. The apparatus transmits signals from opposite ends of the twisted pair subscriber loop using first and second discrete frequency bands. The advantages include longer service reach and deployment without regard to ADSL/SDSL services mix in a binder group.

32 Claims, 4 Drawing Sheets

| Direction | Modulation | Data rate (kbit/s) | Center frequency (kHz) | Low 3-dB frequency (kHz) | High 3-dB frequency (kHz) |
|---|---|---|---|---|---|
| DTU-C to DTU-R | 64-QAM | 1560 | 310 | 180 | 440 |
| DTU-R to DTU-C | 64-PAM | 1560 | - | - | 130 |
| DTU-C to DTU-R | 32-QAM | 1300 | 310 | 180 | 440 |
| DTU-R to DTU-C | 32-PAM | 1300 | - | - | 130 |
| DTU-C to DTU-R | 16-QAM | 1040 | 310 | 180 | 440 |
| DTU-R to DTU-C | 16-PAM | 1040 | - | - | 130 |
| DTU-C to DTU-R | 8-QAM | 780 | 310 | 180 | 440 |
| DTU-R to DTU-C | 8-PAM | 780 | - | - | 130 |
| DTU-C to DTU-R | 4-QAM | 520 | 310 | 180 | 440 |
| DTU-R to DTU-C | 4-PAM | 520 | - | - | 130 |

FIG. 7

| Direction | Modulation | Data rate (kbit/s) | Center frequency (kHz) | Low 3-dB frequency (kHz) | High 3-dB frequency (kHz) |
|---|---|---|---|---|---|
| DTU-C to DTU-R | 64-QAM | 1560 | 320 | 190 | 450 |
| DTU-R to DTU-C | 4096-QAM | 1560 | 75 | 10 | 140 |
| DTU-C to DTU-R | 32-QAM | 1300 | 320 | 190 | 450 |
| DTU-R to DTU-C | 1024-QAM | 1300 | 75 | 10 | 140 |
| DTU-C to DTU-R | 16-QAM | 1040 | 320 | 190 | 450 |
| DTU-R to DTU-C | 256-QAM | 1040 | 75 | 10 | 140 |
| DTU-C to DTU-R | 8-QAM | 780 | 320 | 190 | 450 |
| DTU-R to DTU-C | 64-QAM | 780 | 75 | 10 | 140 |
| DTU-C to DTU-R | 4-QAM | 520 | 320 | 190 | 450 |
| DTU-R to DTU-C | 16-QAM | 520 | 75 | 10 | 140 |

FIG. 8

| Direction | Carriers | Data rate (kbit/s) | Bits per Hertz (Average) | Low 3-dB frequency (kHz) | High 3-dB frequency (kHz) |
|---|---|---|---|---|---|
| 4 kHz effective channels with 4.3125 kHz spacing | | | | | |
| DTU-C to DTU-R | 41 to 111 | 1680 | 6 | 175 | 481 |
| DTU-R to DTU-C | 4 to 31 | 1680 | 15 | 15 | 136 |
| 8 kHz effective channels with 9.125 kHz spacing | | | | | |
| DTU-C to DTU-R | 20 to 55 | 1680 | 6 | 178 | 506 |
| DTU-R to DTU-C | 2 to 15 | 1680 | 15 | 14 | 141 |

FIG. 9

LONG REACH SDSL SYSTEM SPECTRALLY COMPATIBLE WITH ADSL SYSTEMS

CROSS-REFERENCE TO RELATED PROVISIONAL APPLICATION

This application claims priority from Applicant's Provisional Application Serial No. 60/123,668 filed on Mar. 9, 1999 and entitled LONG REACH SDSL SYSTEM SPECTRALLY COMPATIBLE WITH ADSL SYSTEMS.

TECHNICAL FIELD

The invention relates to the delivery of data services to customer premises, and in particular to a Symmetrical Digital Subscriber Line (SDSL) system adapted to be spectrally compatible with an Asymmetric Digital Subscriber Line (ADSL) standard system.

BACKGROUND OF THE INVENTION

SDSL is a high-speed data service that can be provided over a standard telephone line (twisted copper wire pair) referred to as a "subscriber loop". Unlike Asynchronous Digital Subscriber Line (ADSL) which provides fast downstream data transport to a subscriber's premises and slow upstream data transport to the service provider, SDSL provides data transport at the same speed in each direction. Many World Wide Web-based applications that benefit from SDSL are now being developed and the demand for the service is growing.

Traditional SDSL systems achieve symmetry in the data rates by using the same modulation technique, using the same signal bandwidth and transmitting at the same output power from each end of the communication medium. The use of that type of signals creates Near End CrossTalk (NEXT) between co-located transmitters and receivers and limits the service reach, i.e. the length of the subscriber loop over which the service is supported is limited.

Various techniques have been proposed for extending the data transmission reach of SDSL systems. These techniques include the use of coding gain to permit operation at very low SNR, and the use of higher Pulse Amplitude Modulation indexes to reduce the bandwidth of the transmitted signal in order to operate in a frequency band where Near End CrossTalk (NEXT) interference is not severe. Each of these techniques provide only a small incremental benefit.

Another proposed technique for extending SDSL reach is the use of signal repeaters. This however creates additional costs and operational problems in the deployment, the powering and the maintenance of such repeaters. The use of signal repeaters also creates a spectral compatibility problem by introducing high signal levels into the cable at a location where the signal levels are normally low. This problem can be solved by installing a signal repeater on all the pairs carrying a digital data signal and sharing the same cable, but is very difficult to manage when the cable is shared by multiple service providers. For those reasons, it is preferable to deploy digital data services without using signal repeaters.

Data services are also offered using Asymmetric Digital Subscriber Line (ADSL) service over copper twisted pairs. ADSL systems are adapted to reduce NEXT interference from other ADSL equipment using a Frequency Division Multiplexing (FDM) technique to transmit and receive signals. Data transmission over ADSL systems is regulated under the ANSI T1.413 standard which defines a spectral density for the upstream and downstream frequency bands.

When ADSL data service is provided along with SDSL service from the same central location, via the same cable and over adjacent twisted copper pairs, NEXT interference cannot be reduced in either system using signal filters because the interference is within the input frequency band of each receiver. Managing cross-system interference generates high operating costs to service providers, which is ultimately passed on to subscribers.

Solutions that have been proposed to mitigate the interference of SDSL and ADSL services deployed over the same cable include deployment rules that limit the number of SDSL and/or ADSL subscriber loops per cable or cable binder, or require binder group segregation between SDSL and ADSL systems. This solution introduces additional operating costs when both services are provided by a single service provider, and does not support a de-regulated environment in which multiple service providers provide data services from the same central location.

With the rapid deployment of consumer ADSL services, the demand for SDSL services is expected to increase. SDSL services are important, for example, in web site provisioning. Satisfying the demand for SDSL services should not be done at the expense of degrading the performance of ADSL services.

There is therefore a need for apparatus and methods to provide a long data transmission reach for the delivery of SDSL services while reducing NEXT interference. Reduction of NEXT interference between SDSL and ADSL services deployed over the same cable is also desirable.

SUMMARY OF THE INVENTION

It is an object of the invention to enable the deployment of SDSL and ADSL services from the same copper plant by reducing electromagnetic interference between SDSL and ADSL services deployed in the same binder group.

It is a further object of the invention to enable the deployment of SDSL and ADSL services on adjacent copper pairs in the same binder group.

In accordance with one aspect of the invention, there is provided a method of transmitting Symmetric Digital Subscriber Line (SDSL) signals over twisted pair copper wires in a cable that interconnects a central location having a plurality of Digital Transmission Units (DTU-C) with a plurality of subscriber premises respectively having at least one Digital Transmission Units (DTU-R), the method comprises a first step of dividing a transmit power spectrum into an upstream frequency band and a downstream frequency band. Signals from the DTU-R are transmitted using the upstream frequency band, and signals from the DTU-C are transmitted using the downstream frequency band.

In accordance with another aspect of the invention, there is provided an apparatus for transmitting Symmetric Digital Subscriber Line (SDSL) signals over twisted pair copper wires in a cable that interconnects a central location having a plurality of Digital Transmission Units (DTU-C) with a plurality of subscriber premises respectively having at least one Digital Transmission Units (DTU-R). The apparatus comprises a Digital Transmission Unit (DTU-R) for transmitting signals from the customer's premises using an upstream frequency band, and a Digital Transmission Unit (DTU-C) for transmitting signals from the central location using a downstream frequency band. The upstream and the downstream frequency bands are discrete frequency bands that do not overlap.

In accordance with yet a further aspect of the invention, there is provided a method of providing Asynchronous Digital Subscriber Line (ADSL) and Symmetric Digital Subscriber Line (SDSL) services from a central location, comprising a step of offering the SDSL service using Digital Transmission Units (DTU) at the central location (DTU-C) that generate transmit signals in a first frequency band, and Digital Transmission Units (DTU) at customer premises (DTU-R) that generate transmit signals in a second frequency band that does not overlap the first frequency band. The first and second frequency bands are spectrally compatible with corresponding frequency bands used by the ADSL service.

In accordance with yet another aspect of the invention, there is provided a method of providing extended-reach Symmetric Digital Subscriber Line (SDSL) service, comprising using Digital Transmission Units (DTU) at a central location (DTU-C) that generate transmit signals in a first frequency band, and Digital Transmission Units (DTU) at customer' premises (DTU-R) that generate transmit signals in a second frequency band that does not overlap the first frequency band.

The invention thereby provides methods that enable widespread deployment of SDSL at a reduced cost while improving the service range by increasing the SDSL service reach.

BRIEF DESCRIPTION OF THE DRAWINGS

The invention will now be explained by way of example only, and with reference to the following drawings, in which:

FIG. 7 is a table defining signal parameters as they apply to an embodiment of the invention using QAM/CAP signal modulation techniques for downstream transmission signals and PAM signal modulation techniques for the upstream transmission signals;

FIG. 8 is a table defining signal parameters as they apply to an embodiment of the invention using QAM/CAP signal modulation techniques for both downstream and upstream transmission signals; and FIG. 9 is a table defining carrier allocations as they apply to two embodiments of the invention using DMT signal modulation techniques for the downstream and upstream transmission signals.

DETAILED DESCRIPTION OF THE EMBODIMENTS

The invention relates to digital transmission systems adapted to provide symmetrical data communications over a voice communication network such as a distribution sector of a Public Switched Telephone Network (PSTN).

Figure 1:
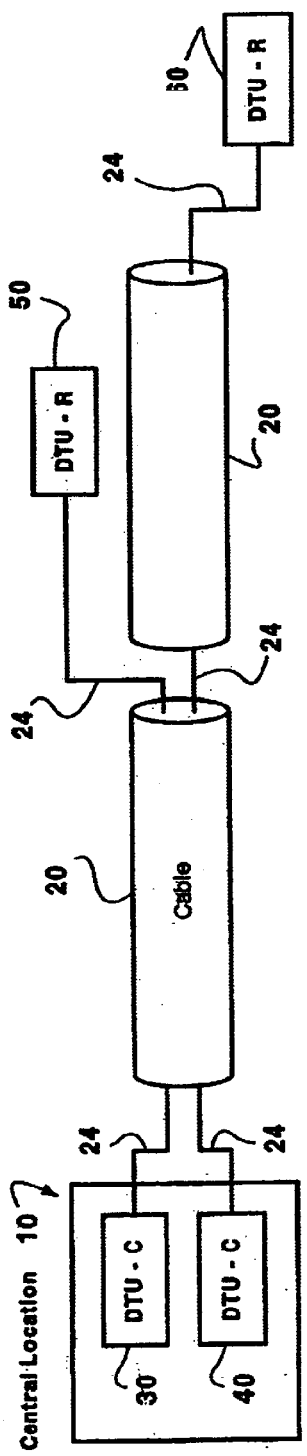
FIG. 1 is a schematic diagram showing elements used in providing data services from a central location.

The provision of data services from a central office in a telephone network is well known. As shown in FIG. 1, in the provision of such services a plurality of Digital Transmission Units (DTU-Cs) 30,40 are typically located at a central location 10. The plurality of DTU-Cs communicate with a plurality of distributed Digital Transmission Units (DTU-R) 50,60 located at customer premises. Communication takes place between the DTU-Cs and the DTU-Rs over a shared medium such as a cable or a set of cables containing a plurality of twisted copper wire pairs referred to as "local loops". The effective data transmission rate of a DTU-C to a DTU-R (downstream direction) is the same as the effective data transmission rate of the DTU-R to DTU-C (upstream direction). The service is referred to as a Symmetrical Digital Subscriber Line (SDSL) service.

Each DTU-C is connected to a DTU-R by a single twisted copper pair 24. However because several twisted copper pairs are bundled together in a cable 20, in what is referred to as binder groups, some signal leakage or "crosstalk" occurs between adjacent twisted copper pairs 24 when data is transmitted. This crosstalk causes interference in adjacent DTU-Cs and DTU-Rs and affects the quality of the received signal.

Figure 2:
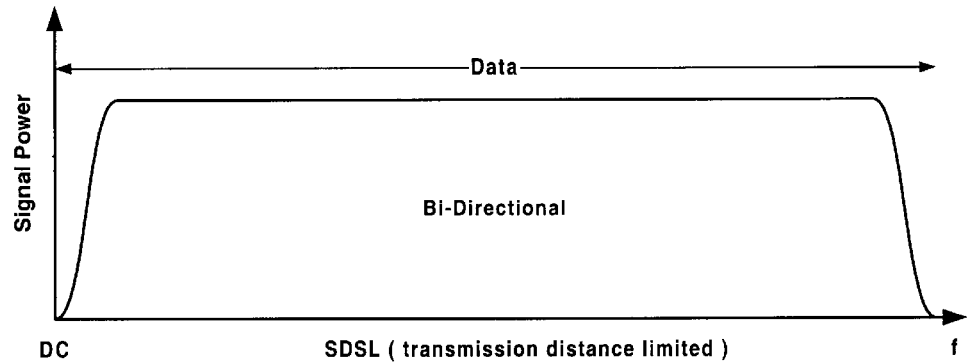
FIG. 2 is a spectral density diagram showing a signal power distribution of a traditional SDSL system.

Traditional SDSL systems achieve symmetry in the data rates by using the same modulation technique, the same signal bandwidth, and transmitting at the same output power from each end of the twisted pair 24. A graphical representation of the power spectral density is shown in FIG. 2. The crosstalk between adjacent twisted copper pairs 24 causes a signal interference to occur between the output transmitter of a DTU-C 30 to the input receiver of another DTU-C 40. There is also a similar signal interference path from the output transmitter of a DTU-R 50 and the input receiver of the DTU-R 60. This interference path induces the highest level of interference in each unit when the two DTU-Rs 50,60 are co-located. If the units are not co-located, the DTU-R 50 is partially protected from noise induced by a signal originating from the DTU-R 60 due to attenuation resulting from signal propagation over a second section of cable 20.

However, with respect to interference induced by the transmitter of DTU-R 50 in the receiver of DTU-R 60, the effective Signal-to-Noise Ratio (SNR) remains constant regardless of the length of the second section of cable 20 and is the same as if DTU-Rs 50 and 60 were co-located at the location of DTU-R 50. This is because a downstream signal transmitted from DTU-C 40 and the crosstalk signal generated by an upstream signal transmitted by DTU-R 50 are subject to substantially the same attenuation over the length of the second section of cable 20 as the signals propagate towards the DTU-R 60.

Interference from a transmitter co-located with a receiver is called Near-End CrossTalk (NEXT) and limits the distance (reach) over which the DTU-C 40 and the DTU-R 60 can communicate. If the same modulation technique and the same signal bandwidth are used at each end of the twisted pair 20, NEXT interference is within the input frequency band of the receiver and cannot be segregated out using signal filters.

Figure 3:
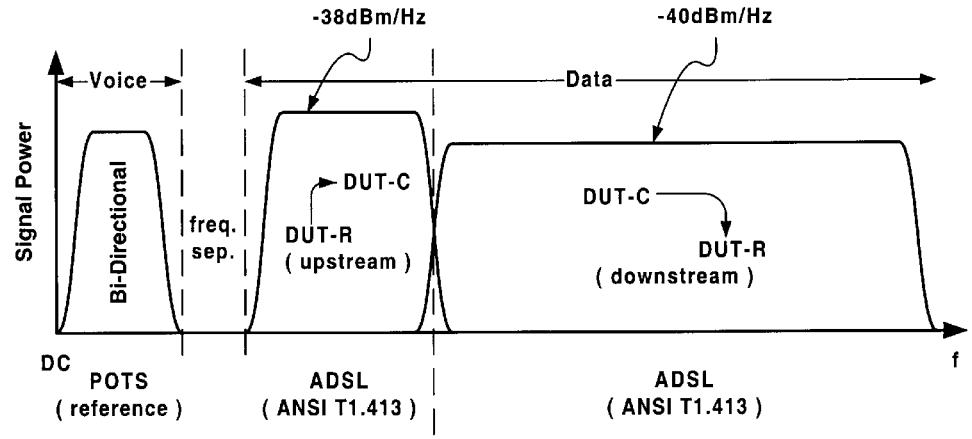
FIG. 3 is a spectral density diagram showing a signal power distribution of an ADSL service in accordance with the ANSI T1.413 standard.

FIG. 3 shows signal power distribution of an Asymmetrical Digital Subscriber Line (ADSL) service in accordance with the ANSI T1.413 standard.

Figure 4:
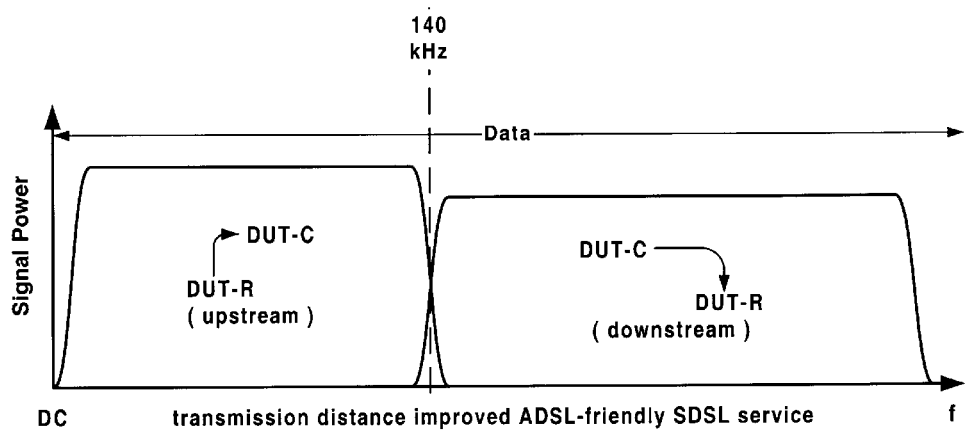
FIG. 4 is a spectral density diagram showing a signal power distribution in providing SDSL services in accordance with a preferred embodiment of the invention.

FIG. 4 shows a signal power distribution for providing SDSL services in accordance with a preferred embodiment of the invention. In accordance with the invention, Frequency Division Multiplexing (FDM) is applied to SDSL systems. For spectral compatibility with ADSL systems, the low frequency band is reserved for DTU-R to DTU-C (upstream) communication and the high frequency band is reserved for DTU-C to DTU-R (downstream) communication.

Figure 5:
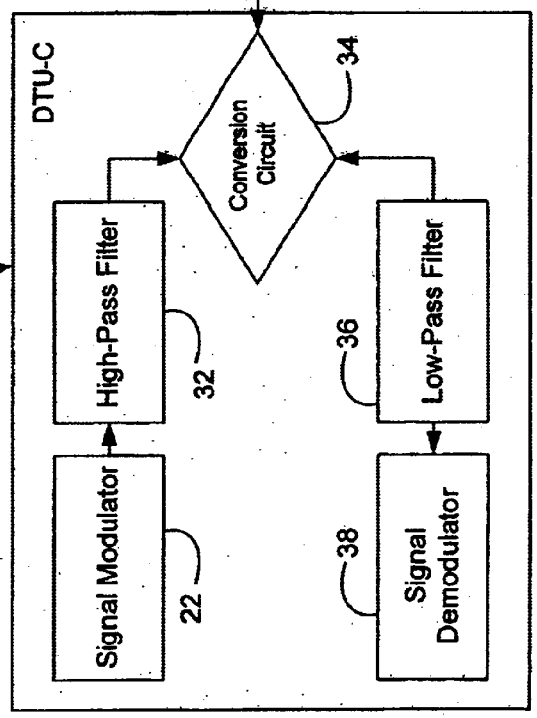
FIG. 5, which appears on sheet one of the drawings, is a block diagram of a DTU-C in accordance with a preferred embodiment of the invention.

FIG. 5 shows a block diagram of a DTU-C unit 50 in accordance with a preferred embodiment of the invention. A signal modulator 22 produces a modulated high frequency data signal that is passed through a high-pass filter 32 to remove unwanted signal energy within a local receiver low frequency band, and provide a high frequency transmit signal. A 4-wire to 2-wire conversion circuit 34 applies the high frequency transmit signal to the twisted copper pair 24 and extracts a low frequency received signal from it. The 4-wire to 2-wire conversion circuit 34 therefore operates as a signal coupler to couple the high frequency transmit signal to the twisted pair 24 and as a signal decoupler to decouple the received low frequency signal from the twisted pair 24.

The low frequency received signal contains the low frequency data signal transmitted from the distant DTU-R 70 (FIG. 6) combined with the output signal of the DTU-C 50, as attenuated by the high-pass filter 32, the 4-wire to 2-wire conversion circuit 34, and combined with the NEXT noise from any other DTU-C sharing the same cable with the twisted pair 24. The received low frequency signal is passed through a low-pass filter 36 that is designed to remove the combined interference resulting from each of the DTU-C output signals. The received signal low frequency signal is then passed to a signal demodulator 38.

The attenuation characteristic of the high-pass filter 32 is based on the level of out-of-band energy present at the output of the signal modulator 22 within the pass-band of the signal demodulator 38, combined with the signal rejection achieved through the 4-wire to 2-wire conversion circuit 34 and the level of the received upstream signal. The resulting SNR must enable adequate reception of the DTU-R upstream signal. Care must be taken to ensure adequate linearity in the high-pass filter 32 and the 4-wire to 2-wire circuit 34 in order to avoid generating distortion products that could replace the unwanted signal energy that was filtered out.

The attenuation characteristic of the low-pass filter 36 is based on the transmit signal rejection achievable through the 4-wire to 2-wire conversion circuit 34, combined with the level of the received upstream signal at the end of the longest twisted pair 24, and the dynamic range available at the input of the signal demodulator 38.

Figure 6:
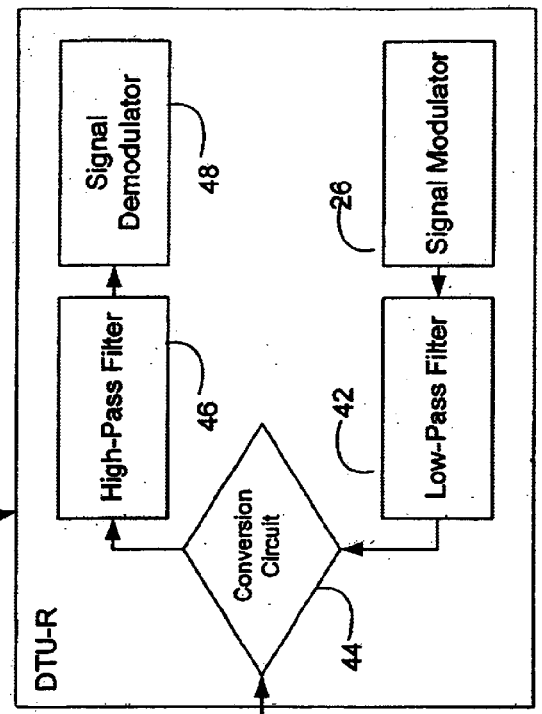
FIG. 6, which also appears on sheet one of the drawings, is a block diagram of a DTU-R in accordance with a preferred embodiment of the invention.

FIG. 6, is a block diagram of a DTU-R unit 70 in accordance with a preferred embodiment of the invention. A signal modulator 26 produces a modulated low frequency data signal that is passed through a low-pass filter 42 to remove the unwanted signal energy within the local receiver high frequency band and provide a low frequency transmit signal.

A 4-wire to 2-wire conversion circuit 44 applies the low frequency transmit signal to the twisted copper pair 24 and extracts a received high frequency downstream signal from the twisted copper pair. The 4-wire to 2-wire conversion circuit 44 therefore operates as a signal coupler to couple the low frequency transmit signal to the twisted pair 24 and as a signal decoupler to decouple the received high frequency signal from the twisted pair 24.

The high frequency received signal contains the high frequency data signal transmitted from the distant DTU-C 50 (FIG. 5) combined with the transmit signal of the DTU-R 70, as attenuated by the low pass filter 42, the 4-wire to 2-wire conversion circuit 44 and combined with the NEXT noise from all other DTU-Rs sharing the same cable 20 (FIG. 1) with the twisted pair 24. The received downstream signal is passed through a high-pass filter 42 designed to remove the combined interference resulting from all the DTU-R output signals. The received downstream signal is then passed to signal demodulator 48.

The DTU-R low-pass filter 42 attenuation characteristic is based on the level of out-of-band energy present at the output of the signal modulator 26 within the pass-band of the signal demodulator 48, combined with the signal rejection achieved in the 4-wire to 2-wire conversion circuit 44 and the level of the downstream signal received on the twisted pair 24. The resulting SNR must be adequate to permit reception of the DTU-C downstream signal. Care should be taken to ensure adequate linearity in the low-pass filter 42 and the 4-wire to 2-wire circuit 44 so as to avoid generating distortion products that could replace the unwanted signal energy that was filtered out.

The DTU-R high-pass filter 46 attenuation characteristic is based on the transmit signal rejection achieved in the 4-wire to 2-wire conversion circuit 44 combined with the level of the downstream signal received at the end of the longest twisted pair 24 and the dynamic range available at the input of the signal demodulator 48.

The 4-wire to 2-wire conversion circuits 34 and 44 can be any one of several circuits well known in the art, including passive and active hybrid circuits. An active echo-canceller can also be used to increase the effective trans-hybrid loss.

FIG. 4 shows the frequency spectrum occupancy of the DTU-C to DTU-R (downstream) and of the DTU-R to DTU-C (upstream) signals. This selection of signal power spectral densities provides spectral compatibility with ADSL systems, and complies with the ANSI T1.413 standard. For compatibility with that standard, the power spectral density of the transmitted signal is set to −40 dBm/Hz in the DTU-C to DTU-R (downstream) direction and to −38 dBm/Hz in the DTU-R to DTU-C (upstream) direction, but other power spectral densities may also be used, if desired. For further spectral compatibility with ADSL systems complying with the ANSI T1.413 standard, the maximum frequency used in the DTU-R to DTU-C (upstream) direction is set to approximately 140 kHz. Of course, a different maximum frequency could be used, if spectral compatibility with ANSI T1.413 is not required.

The signal in the DTU-C to DTU-R (downstream) direction occupies a wider bandwidth than the signal in the DTU-R to DTU-C (upstream) direction because of higher cable attenuation at higher frequencies, which requires a lower modulation density. This constraint requires a wider downstream bandwidth in order to convey data at a rate equal to that used in the upstream direction.

In accordance with the invention, because the signal used in the DTU-R to DTU-C (upstream) direction is in the low frequency sector of the frequency spectrum, the upstream signal can be modulated by signal modulator 26 using any variant of Pulse Amplitude Modulation (PAM), including 2B1Q coding. Alternatively, the upstream signal can be modulated using a pass-band modulation scheme such as Quadrature Amplitude Modulation (QAM) or Carrier-less Amplitude and Phase (CAP) modulation by adjusting the signal center frequency as close as possible to DC while avoiding signal spill-over around 0 Hertz. A Discrete Multi-Tone (DMT) modulation can also be used to modulate the upstream signal by selecting carrier frequencies close to DC.

In accordance with the invention, as the signal used in the DTU-C to DTU-R (downstream) direction is in the high frequency part of the frequency spectrum, the downstream signal can be modulated using any variant of Quadrature Amplitude Modulation (QAM) or Carrier-less Amplitude and Phase (CAP) modulation, by adjusting the signal centre frequency to avoid an overlap with the DTU-R to DTU-C (upstream) signal. A Discrete Multi-Tone (DMT) modulation can also be used to modulate the downstream signal by selecting carrier frequencies to avoid the overlap with the upstream signal.

FIGS. 7–9 are tables that provide examples of frequency-divided SDSL signals in accordance with the invention for achieving symmetrical data rates over telephone grade twisted copper pairs, while being spectrally compatible with ANSI T1.413 ADSL systems. The frequency division properties of the SDSL systems in accordance with the invention as well as the spectral compatibility with ADSL ensure maximum reach of both systems by reducing NEXT interference within the SDSL systems and across SDSL and ADSL systems. SDSL and ADSL services can therefore be offered on twisted copper pairs in the same binder group without noticeable degradation of the performance of either one.

In the examples described below, it is assumed that the SDSL service is not combined with a Plain Old Telephone Service (POTS) on the same twisted copper pair. Therefore, it is not necessary to preserve a large frequency separation between the voice frequency band and the data signal frequency band.

FIG. 7 shows signal options for using a QAM/CAP modulated SDSL downstream signal and a PAM modulated SDSL upstream signal. A different downstream center frequency could be used, while still preserving the frequency division nature of the signals. However, using a different downstream center frequency has the effect of widening or narrowing a gap between the upstream and the downstream signals, which may impact the complexity of the band split filters used. As the PAM modulated signal is a baseband signal, the low 3-dB frequency and center frequency do not apply. The use of a symbol transfer rate of 260 kbaud is assumed in the given examples.

The various modulation densities presented in FIG. 7 permit a reduction in data rate in order to increase the distance at which SDSL service may be provided. A rate adaptive system can automatically select a best data rate based on signal attenuation on a twisted copper pair over which the SDSL service is offered. Other techniques known in the art may also be employed to select a most appropriate data rate.

FIG. 8 shows signal options for using a QAM/CAP modulated SDSL downstream signal and a QAM/CAP modulated SDSL upstream signal. An excess bandwidth factor of 15% has been used for the band limiting filter of the upstream signal. A different downstream centre frequency could be used, while still preserving frequency division between the upstream and downstream signals. However, this has the effect of widening or narrowing the gap between the upstream and the downstream signals, which may impact the complexity of the band split filters used. All downstream signals use a symbol transfer rate of 260 kbaud and all upstream signals use a symbol transfer rate of 130 kbaud in the examples presented.

The various modulation densities presented in FIG. 8 permit a reduction in data rate in order to increase the distance at which SDSL service may be provided. A rate adaptive system can automatically select a most appropriate data rate based on the signal attenuation on a twisted copper pair over which the SDSL service is provided. Other techniques known in the art can be employed to select a most appropriate data rate.

The use of PAM or QAM/CAP modulation ensures low end-to-end latency as is desirable in many applications. In the cases where latency is not a concern, Discrete Multi-Tone (DMT) modulation may be used. Many integrated modulator/demodulator circuits compliant with the ANSI T1.413 standard are commercially available. Therefore, signal parameters defined in that standard may be used to provide SDSL service, in order to enable use of existing components and technology.

FIG. 9 shows a carrier allocation for two DMT signalling implementations in accordance with the invention. The upstream and downstream signals using DMT modulation preferably use carriers spaced by 4.3125 kHz. Each carrier transports 4 kHz of data plus an overhead associated with a synchronisation symbol and a cyclic prefix characteristic of DMT transmissions. A synchronisation symbol is transmitted after each 68 data symbols. The upstream signal uses a 4-sample cyclic prefix based on a 276 ksample conversion rate and the downstream signal uses a 16-sample cyclic prefix based on a 1104 sample conversion rate. Depending on the number of carriers required, the upstream signal modulator 26 may perform a 64-point inverse discrete Fournier Transform (IDFT) and the downstream signal modulator 22 may perform a 256-point IDFT. Other parameter selections may be used to support different implementations. Due to the 4 kHz signal processing rate, the minimum latency is 0.25 ms at each end, plus a signal processing delay. Actual latencies are commonly between 0.75 ms and 1.0 ms end-to-end, aside from delays introduced by error correction.

If the latency is unacceptable, the DMT signal processing rate can be increased, for example, to 8 kHz. If the signal processing rate is 8 kHz with one synchronisation symbol after each 72-data symbols and a cyclic prefix, the carrier spacing is 9.125 kHz. At that signal processing rate, the upstream signal uses a 4-sample cyclic prefix based on a 292-ksample conversion rate and the downstream signal uses a 16-sample cyclic prefix based on an 1168-ksample conversion rate. Depending on the number of carriers required, the upstream signal modulator 26 can perform a 32-point IDFT and the downstream signal modulator 22 can perform a 128-point IDFT. As will be understood by those skilled in the art, other parameters may be used for different implementations. At the 8 kHz signal processing rate, the minimum latency is 0.125 ms at each end plus the signal processing delay. Actual latencies are typically between 0.375 ms and 0.5 ms end-to-end, aside from delays introduced by error correction.

One carrier in the downstream direction is preferably reserved for transmission of a timing recovery pilot tone. If a pilot tone is desired in the upstream direction, another carrier may be added for that purpose. Different data rates can be achieved by changing the bit/Hertz allocation for respective carriers.

The embodiments of the invention described above are intended to be exemplary only. The scope of the invention is therefore intended to be limited solely by the scope of the appended claims.

I claim:

1. A method of transmitting Symmetric Digital Subscriber Line (SDSL) signals over twisted pair copper wires in a cable that interconnects a central location having a plurality of Digital Transmission Units (DTU-C) with a plurality of subscriber premises respectively having at least one Digital Transmission Unit (DTU-R), the method comprising the step of:

a) dividing a transmit power spectrum into an upstream frequency band and a downstream frequency band;

b) receiving signals transmitted by the DTU-R using the upstream frequency band; and c) transmitting signals from the DTU-C using the downstream frequency band.

2. A method as claimed in claim 1, wherein the upstream and the downstream frequency bands have spectral compatibility with corresponding frequency bands of Asymmetrical Digital Subscriber Line (ADSL).

3. A method as claimed in claim 1, wherein the upstream frequency band is a low frequency band and the downstream frequency band is a high frequency band.

4. A method as claimed in claim 3, wherein the downstream frequency band is wider than the upstream frequency band to allow the use of a lower modulation index in order to compensate for higher attenuation on the twisted pair due to the higher frequency.

5. A method as claimed in claim 1, wherein the signals transmitted by the DTU-R are generated by:

a) generating a modulated low frequency signal;

b) filtering high frequency components from the modulated low frequency signal using a low frequency band pass filter to provide a filtered low frequency signal; and c) applying the filtered low frequency signal to the twisted pair using a signal coupler.

6. A method as claimed in claim 5, wherein the low frequency signal is generated using Pulse Amplitude Modulation (PAM).

7. A method as claimed in claim 6, wherein the Pulse Amplitude Modulation (PAM) is 2B1Q coding.

8. A method as claimed in claim 5, wherein the step of generating a modulated low frequency signal is performed using a pass-band modulation.

9. A method as claimed in claim 8, wherein the pass-band modulation is Quadrature Amplitude Modulation (QAM).

10. A method as claimed in claim 8, wherein the pass-band modulation is Carrier-less Amplitude and Phase (CAP).

11. A method as claimed in claim 5, wherein the step of generating a modulated low frequency signal is performed using Discrete Multi-Tone (DMT) modulation.

12. A method as claimed in claim 1, wherein the upstream signal transmitted from the DTU-R is received at the DTU-C, and the method further comprises steps of:

a) extracting a Near-End CrossTalk (NEXT) contaminated modulated low frequency signal from the twisted pair using a signal decoupler; and b) filtering high frequency components from the NEXT contaminated modulated low frequency signal to remove NEXT contamination using a low frequency band pass filter to provide a modulated low frequency signal for demodulation.

13. A method as claimed in claim 1, wherein the step of transmitting signals from the DTU-C using the downstream frequency band further comprises steps of:

a) generating a modulated high frequency signal;

b) filtering low frequency components from the modulated high frequency signal using a high frequency band pass filter to provide a filtered high frequency signal; and c) applying the filtered high frequency signal to the twisted pair using a signal coupler.

14. A method as claimed in claim 13, wherein the high frequency signal is generated using pass-band modulation.

15. A method as claimed in claim 14, wherein the pass-band modulation is Quadrature Amplitude Modulation (QAM).

16. A method as claimed in claim 14, wherein the pass-band modulation is a Carrier-less Amplitude and Phase (CAP) modulation.

17. A method as claimed in claim 14, wherein the modulated high frequency signal is generated using Discrete Multi-Tone (DMT) modulation.

18. A method as claimed in claim 13, wherein the signals applied to the twisted pair using the signal coupler are received by the DTU-R, and the DTU-R performs steps of:

a) extracting a Near-End CrossTalk (NEXT) contaminated modulated high frequency signal from the twisted pair using a signal decoupler; and b) filtering low frequency components from the NEXT contaminated modulated high frequency signal to remove NEXT interference using a high frequency band pass filter providing a modulated high frequency signal for demodulation.

19. Apparatus for transmitting Symmetric Digital Subscriber Line (SDSL) signals over twisted pair copper wires in a cable that interconnects a central location having a plurality of Digital Transmission Unit (DTU-C) with a plurality of subscriber premises respectively having at least one Digital Transmission Units (DTU-R), the apparatus comprising:

a) a Digital Transmission Unit (DTU-R) for transmitting signals from the customer's premises using a low-frequency upstream frequency band; and b) a Digital Transmission Unit (DTU-C) for transmitting signals from the central location using a high-frequency downstream frequency band;

whereby the upstream and the downstream frequency bands are discrete frequency bands that do not overlap.

20. The apparatus as claimed in claim 19 wherein the DTU-R comprises a signal modulator for generating a transmit signal in a low frequency band; a low-pass filter for removing undesirable high frequency components from the transmit signal; and, a signal coupler connected to the twisted pair for applying the transmit signal to the twisted pair.

21. The apparatus as claimed in claim 20 wherein the signal coupler is a 4-wire to 2-wire conversion circuit that applies the low frequency transmit signal to the twisted pair and extracts a high frequency received signal from the twisted pair.

22. The apparatus as claimed in claim 20 wherein the DTU-R further comprises a high-pass filter designed to remove combined interference resulting from all output signals generated by the DTU-R and all other such DTU-Rs that generate interfering noise on the twisted pair, and a signal demodulator.

23. The apparatus as claimed in claim 19 wherein the DTU-C comprises a signal modulator for generating a transmit signal in the high frequency band; a high-pass filter for removing undesirable low frequency components from the transmit signal; and, a signal coupler connected to the twisted pair for applying the transmit signal to the twisted pair.

24. The apparatus as claimed in claim 23 wherein the signal coupler is a 4-wire to 2-wire conversion circuit that applies the high frequency transmit signal to the twisted pair and extracts a low frequency received signal from the twisted pair.

25. The apparatus as claimed in claim 23 wherein the DTU-C further comprises a low-pass filter designed to remove combined interference resulting from all output signals generated by the DTU-C and all other DTU-Cs that generate interfering noise on the twisted pair, and a signal demodulator.

26. A method of providing Asynchronous Digital Subscriber Line (ADSL) and Symmetric Digital Subscriber Line (SDSL) services from a central location, comprising the steps of:

a) offering the SDSL service using Digital Transmission Units (DTU) at the central location (DTU-C) that generate transmit signals in a first frequency band, and Digital Transmission Units (DTU) at customer' premises (DTU-R) that generate transmit signals in a second frequency band that does not overlap the first frequency band, the first and second frequency bands being spectrally compatible with corresponding frequency bands used by the ADSL service.

27. The method as claimed in claim 26 wherein the ADSL and the SDSL are provided without regard to which of the services is being provided in a binder group of twisted pair subscriber loops for providing the services.

28. The method as claimed in claim 26 wherein the first frequency band is a high frequency band and the second frequency band is a low frequency band.

29. The method as claimed in claim 28 wherein the first frequency band is wider than the second frequency band to allow the use of a lower modulation index in order to compensate for higher attenuation at the high frequency.

30. A method of providing extended-reach Symmetric Digital Subscriber Line (SDSL) service, comprising:

a) using Digital Transmission Units (DTU) at a central location (DTU-C) that generate transmit signals in a first frequency band, and Digital Transmission Units (DTU) at customer' premises (DTU-R) that generate transmit signals in a second frequency band that does not overlap the first frequency band.

31. The method as claimed in claim 30 wherein the first frequency band is a high frequency band and the second frequency band is a low frequency band.

32. The method as claimed in claim 31 wherein the first frequency band is wider than the second frequency band to allow the use of a lower modulation index in order to compensate for higher attenuation at the high frequency.

* * * * *